(No Model.) 3 Sheets—Sheet 1.

G. E. HUNTER & F. H. CORTHELL.
STEM SETTING SECONDS HAND.

No. 455,285. Patented June 30, 1891.

Witnesses:
Jas. E. Hutchinson
Henry C. Hazard

Inventors:
Geo. E. Hunter and Fred. H. Corthell,
by Crindle and Russell, their Attys.

(No Model.) 3 Sheets—Sheet 2.
G. E. HUNTER & F. H. CORTHELL.
STEM SETTING SECONDS HAND.

No. 455,285. Patented June 30, 1891.

Witnesses:
Jas. E. Hutchinson.
Henry C. Hazard.

Inventors
Geo. E. Hunter and Fred H. Corthell,
by Crindle and Russell, their attys.

(No Model.) 3 Sheets—Sheet 3.
G. E. HUNTER & F. H. CORTHELL.
STEM SETTING SECONDS HAND.
No. 455,285. Patented June 30, 1891.
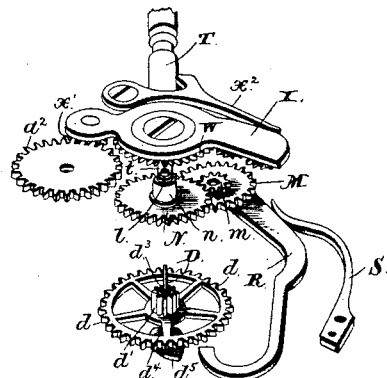
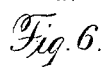
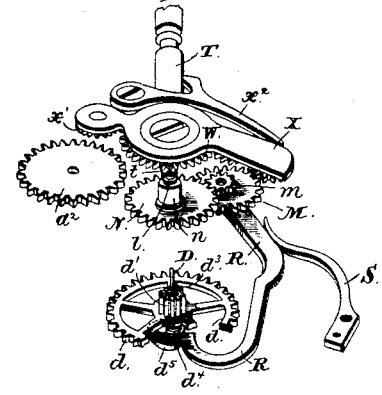
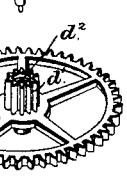
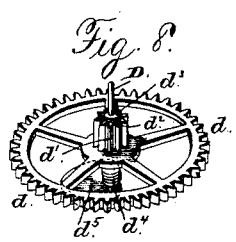
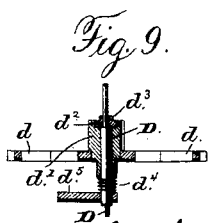
Witnesses:
Jas. E. Hutchinson
Henry C. Hazard
Inventors
Geo. E. Hunter and Fred H. Corthell
by Arundel and Russell, their Attys.

UNITED STATES PATENT OFFICE.

GEORGE E. HUNTER AND FRED H. CORTHELL, OF ELGIN, ILLINOIS, ASSIGNORS TO THE ELGIN NATIONAL WATCH COMPANY, OF SAME PLACE.

STEM-SETTING SECONDS-HAND.

SPECIFICATION forming part of Letters Patent No. 455,285, dated June 30, 1891.

Application filed July 19, 1890. Serial No. 359,300. (No model.)

*To all whom it may concern:*

Be it known that we, GEORGE E. HUNTER and FRED H. CORTHELL, of Elgin, in the county of Kane, and in the State of Illinois, have invented certain new and useful Improvements in Time-Pieces; and we do hereby declare that the following is a full, clear, and exact description thereof, reference being had to the accompanying drawings, in which—

Figure 1:
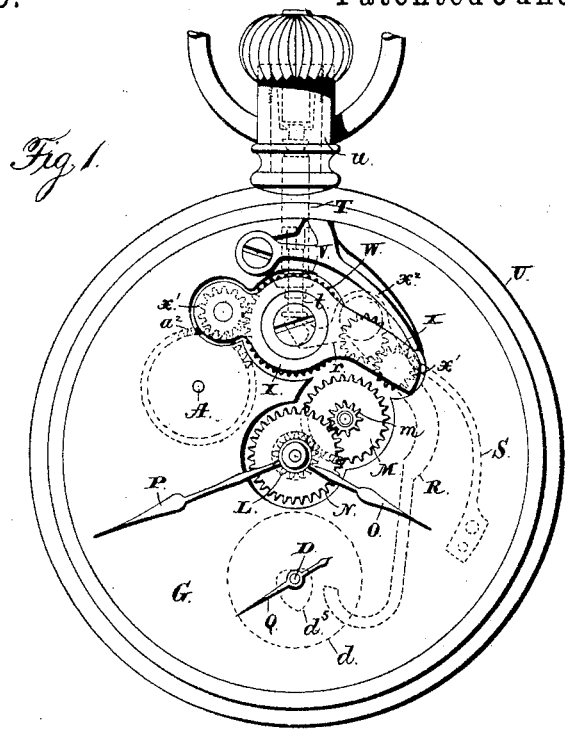
Figure 2:
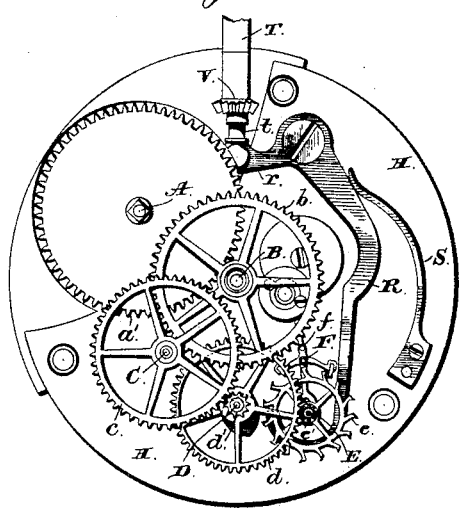
Figure 3:
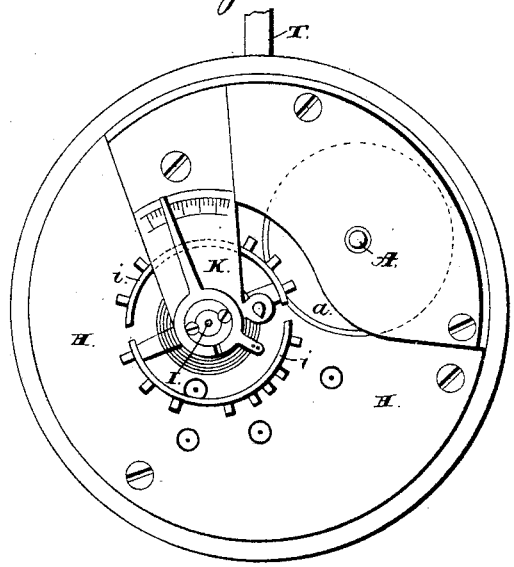
Figure 4:
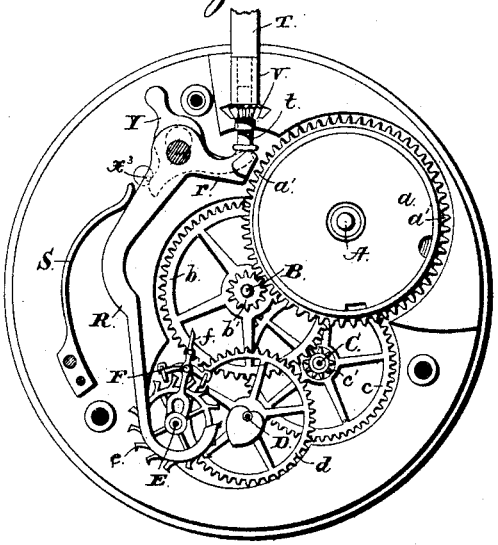

Figure 1 is a plan view from the front of a watch-movement containing our improvement. Fig. 2 is a like view of the same with the front plate removed. Fig. 3 is a plan view of said movement from the rear. Fig. 4 is a like view of the same with the rear plate removed. Fig. 5 is a perspective view of the fourth-wheel arbor, dial-wheels, and setting mechanism separated from the train, said setting mechanism being shown in its normal position. Fig. 6 is a like view of said parts when the seconds-hand has been set at zero and the dial-wheels are engaged with the stem-arbor. Fig. 7 is an enlarged perspective view of the fourth arbor-wheel and pinion separated from each other. Fig. 8 is a like view of the same when combined, and Fig. 9 is a section through the longitudinal axis of said arbor.

Letters of like name and kind refer to like parts in each of the figures.

The object of our invention is to enable the seconds-hand of a watch to be set at zero, when desired, without interference with the movements of the time-train; and to such end our invention consists, principally, in a time-train in which the seconds-hand, that normally is continuously in motion, may be set to and held at zero without stoppage of or interference with the action of such train, substantially as and for the purpose hereinafter specified.

It consists, further, in a time mechanism in which the seconds-hand arbor, that normally is continuously in motion, is frictionally connected with the time-train and is adapted to be moved independently, substantially as and for the purpose hereinafter shown.

It consists, further, in a time mechanism in which the arbor carrying the seconds-hand is frictionally connected with the time-train and is adapted to be rotatively moved to and locked in a definite position without arrest of or interference with the movement of the time-train, said arbor being normally continuously in motion, substantially as and for the purpose hereinafter set forth.

It consists, further, in a time mechanism in which the seconds-hand is frictionally connected with the time-train and, by devices that are actuated by the stem-arbor, is adapted to be moved to and locked at zero without interference with the action of said time-train, substantially as and for the purpose hereinafter shown and described.

It consists, further, in a time mechanism in which the seconds-hand is adapted to be moved to and locked at zero without interference with the action of the time-train, and is automatically moved to zero whenever the hands-setting train is caused to engage with the dial-wheels, substantially as and for the purpose hereinafter specified.

It consists, further, in a time mechanism in which whenever the hands-setting train is caused to engage with the dial-wheels the seconds-hand will be automatically and simultaneously moved to zero, substantially as and for the purpose hereinafter shown.

It consists, further, in a time mechanism in which the seconds-hand is automatically moved to zero by the engagement of the hands-setting train with the dial-wheels and is locked at zero while said train and dial-wheels remain in engagement, substantially as and for the purpose hereinafter set forth.

It consists, further, in a time mechanism in which the seconds-hand is automatically moved to zero by the engagement of the hands-setting train with the dial-wheels, is locked at zero while said train and dial-wheels remain in engagement, and is released and permitted to move with the time-train when said hands-setting train is moved out of engagement with said dial-wheels, substantially as and for the purpose hereinafter shown and described.

It consists, further, in a time mechanism in which by the longitudinal movements of a stem-arbor the hands-setting train may be caused to engage with or be disengaged from the dial-wheels and the seconds-hand simultaneously set at or released from zero, substantially as and for the purpose hereinafter specified.

It consists, further, in a time mechanism in which is combined with a time-train a seconds-hand that is frictionally connected therewith, mechanism whereby the seconds-hand may be moved to and locked at zero, a stem-actuated train which is adapted to be placed in or removed from engagement with the dial-wheels, and a rotatable longitudinally-movable stem-arbor that is adapted to produce and break the setting engagement and to set said seconds-hand at zero, to lock it in such position, and to release it therefrom, substantially as and for the purpose hereinafter shown.

It consists, finally, in details of construction, substantially as and for the purpose hereinafter set forth.

In the carrying of our invention into practice any of the usual forms of time mechanism may be employed; but for convenience we will illustrate its application to but one form, in which an arbor A, carrying a wheel $a$ and spring-barrel $a'$, a second arbor B, provided with a wheel $b$ and pinion $b'$, a third arbor C, having a wheel $c$ and pinion $c'$, a fourth arbor D, provided with a wheel $d$ and pinion $d'$, a fifth arbor E, carrying an escape-wheel $e$ and pinion $e'$, and a pallet-arbor F, having a pallet-lever $f$, are journaled between a front or pillar plate G and a back plate H. A balance-arbor I and wheel $i$, journaled between said front plate and a balance-bridge $k$, completes that portion of the time-train which is wholly or in part contained between said plates. Upon the front end of the second arbor B is placed a cannon-pinion L, which is held thereon by frictional contact and engages a wheel M, that is journaled within a recess in the outer face of said plate. Said wheel is provided upon its outer face with a pinion $m$, which engages with the teeth of a wheel N, that is journaled upon the barrel $l$ of said cannon-pinion, and is in turn provided with a barrel $n$, as shown. Said wheels and pinions constitute the usual dial-works of the watch and carry an hours-hand O, which is placed upon the barrel N, and a minutes-hand P, that is placed upon the barrel $l$ of the pinion L.

The wheel $d$ and pinion $d'$ are secured together and journaled upon the fourth arbor D, instead of being secured thereto, as has heretofore been the case. The front end of said pinion is provided with a recess $d^2$, which fits over a correspondingly-shaped collar $d^3$, that is formed upon or secured to said arbor, and is held against the same with a yielding pressure by means of a spiral spring $d^4$, which encircles the rear portion of said arbor, and has one of its ends in engagement with the rear end of said pinion and the other end in engagement with a plate $d^5$, that is secured upon said arbor near its rear end, the arrangement being such as to unite said parts rotatively by friction, which, while sufficient to cause them to rotate together ordinarily, would not interfere with the movement of the time-train should said arbor be prevented from rotating.

The front end of the fourth arbor D carries a seconds-hand Q, and the friction connection between said arbor and the time-train is for the purpose of enabling said hand to be set at zero when desired, for which purpose the plate $d^5$ has the form of a heart-shaped cam and is engaged upon its periphery, when permitted, by one end of a lever R, the opposite end of which is pivoted upon the back plate H. A spring S, secured upon said plate, presses against said lever with sufficient force to cause the same, when permitted, to bear upon said cam and to turn the latter to and hold it in its normal position with its seconds-hand pointing to zero.

The lever R may be operated by or through the lever of a "lever-set" watch; but in the watch shown it is manipulated through the stem-arbor T, which is capable of both longitudinal and rotary motion, and is preferably held at the inner and outer limits of its longitudinal motion by means of locking mechanism that is contained within the stem or pendant $u$ of the case U. Said arbor has its inner end engaged by a hollow bevel-pinion V, which meshes with a wheel W, that is journaled within a recess in the outer face of the front plate G. Upon the axis of said wheel W is pivoted a yoke X, which at opposite ends carries pinions $x$ and $x'$, that are in constant engagement with said wheel, and by the oscillation of said yoke may be caused to engage with a wheel $a^2$ upon the main or spring-barrel arbor A, or with the dial-wheel M, so as to cause the rotation of said stem-arbor to be communicated to said arbor A to wind the mainspring, or to said dial-wheel M to set the hands.

The yoke X is normally held by a spring $x^2$ with a yielding pressure in such position as to cause engagement with the dial-wheels, but may be moved to the opposite limit of its motion, so as to produce winding engagement, by means of a lever Y, which is pivoted upon the inner face of the front plate G, with one of its arms in engagement with the inner end of the stem-arbor T or with a block $t$, that is contained within the pinion V and operates as a prolongation of said arbor, while its opposite end engages with a stud $x^3$, which projects from one end of said yoke through said plate G, the arrangement being such that when said stem-arbor is moved to the inner limit of its motion said yoke will be swung to cause winding engagement, while when said stem-arbor is moved to the outer limit of its motion said yoke is freed from constraint and by the action of spring $x^2$ is automatically moved into setting engagement. An arm $r$, secured to or formed upon the lever R, is arranged to engage the block $t$, and when the stem-arbor T is at the inner limit of its motion said lever is held out of engagement with the cam $d^5$; but when said stem-arbor is drawn to the outer limit of its motion said lever is left free to be moved by the spring S, and, impinging upon said cam, moves the seconds-hand to zero and holds it there while the hours and minutes hands are being set and until said stem-arbor is again returned to its inner position.

By the construction shown whenever a setting engagement is effected the seconds-hand is automatically and instantly moved to zero, and is held there without interference with the action of the time-train until the hours and minutes hands have been set, when by an inward movement of the stem-arbor said seconds-hand will be released and resume its motion. This enables the hands to be easily and accurately brought into correspondence with each other and with correct time without, as has heretofore been necessary, requiring that the time-train be stopped.

The especial form of setting mechanism shown is no part of our invention, as it may with equal facility be combined with any of the other constructions of "pendant-set" watches, or may be used in connection with "lever-set" movements.

Having thus described our invention, what we claim is—

1. A time mechanism in which the seconds-hand may be moved independently of and without interference with the movement of the time-train, so as to be set and held at zero, said hand being so moved through the hours and minutes hands setting devices, substantially as and for the purpose specified.

2. In combination with a time-train having a seconds-hand journaled frictionally upon its arbor, the devices for setting the hours and minutes hands, adapted to effect a movement of said seconds-hand upon its arbor without interference with the action of said train, substantially as and for the purpose shown.

3. In combination with a time-train, the seconds-hand arbor forming a part thereof, the seconds-hand journaled thereon so as to be movable independently thereof, and the devices for setting the hours and minutes hands, adapted to cause a movement of said seconds-hand to a definite position without interference with the action of said train, substantially as and for the purpose set forth.

4. A time mechanism in which the seconds-hand is frictionally connected with the time-train and by devices that are actuated by the stem-arbor is adapted to be moved to and locked at zero without interference with the action of said time-train, substantially as and for the purpose shown and described.

5. A time mechanism in which the seconds-hand is adapted to be moved to and locked at zero without interference with the action of the time-train and is automatically moved to zero whenever the hands-setting train is caused to engage with the dial-wheels, substantially as and for the purpose specified.

6. A time mechanism in which, whenever the hands-setting train is caused to engage with the dial-wheels, the seconds-hand will be automatically and simultaneously moved to zero, substantially as and for the purpose shown.

7. A time mechanism in which the seconds-hand is automatically moved to zero by the engagement of the hands-setting train with the dial-wheels and is locked at zero while said train and dial-wheels remain in engagement, substantially as and for the purpose set forth.

8. A time mechanism in which the seconds-hand is automatically moved to zero by the engagement of the hands-setting train with the dial-wheels, is locked at zero while said train and dial-wheels remain in engagement, and is released and permitted to move with the time-train when said hands-setting train is moved out of engagement with said dial-wheels, substantially as and for the purpose shown and described.

9. A time mechanism in which, by the longitudinal movements of a stem-arbor, the hands-setting train may be caused to engage with or be disengaged from the dial-wheels and the seconds-hand simultaneously set at or released from zero, substantially as and for the purpose specified.

10. A time mechanism in which is combined with a time-train a seconds-hand that is frictionally connected therewith, mechanism whereby the seconds-hand may be moved to and locked at zero, a stem-actuated train which is adapted to be placed in or removed from engagement with the dial-wheels, and a rotatable longitudinal movable stem-arbor that is adapted to produce and break the setting engagement and to set said seconds-hand at zero, to lock it in such position, and to release it therefrom, substantially as and for the purpose shown.

11. In combination with a time-train having an independently-movable seconds-hand arbor, the hours and minutes hands setting devices, and the pivoted lever to transmit movement when said devices are actuated to said arbor, substantially as and for the purpose shown.

12. In combination with a time-train having an independently-movable seconds-hand arbor, the longitudinally-movable stem-arbor, and the devices between the two arbors to transmit movement when the stem-arbor is actuated to the other, substantially as and for the purpose described.

13. In combination with a time-train having an independently-movable seconds-hand arbor, the longitudinally-movable stem-arbor, the lever pivoted near the latter adapted to cause movement of said seconds-hand arbor, and the spring for moving said lever to throw said seconds-hand arbor so as to point its hand to zero and hold it there, said stem-arbor also engaging with said lever and operating to release said seconds-hand arbor, thereby permitting it to resume its motion, substantially as and for the purpose specified.

In testimony that we claim the foregoing we have hereunto set our hands this 24th day of May, 1890.

GEORGE E. HUNTER.
FRED H. CORTHELL.

Witnesses:
W. H. CLOUDMAN,
W. P. HEMMERS.